UNITED STATES PATENT OFFICE.

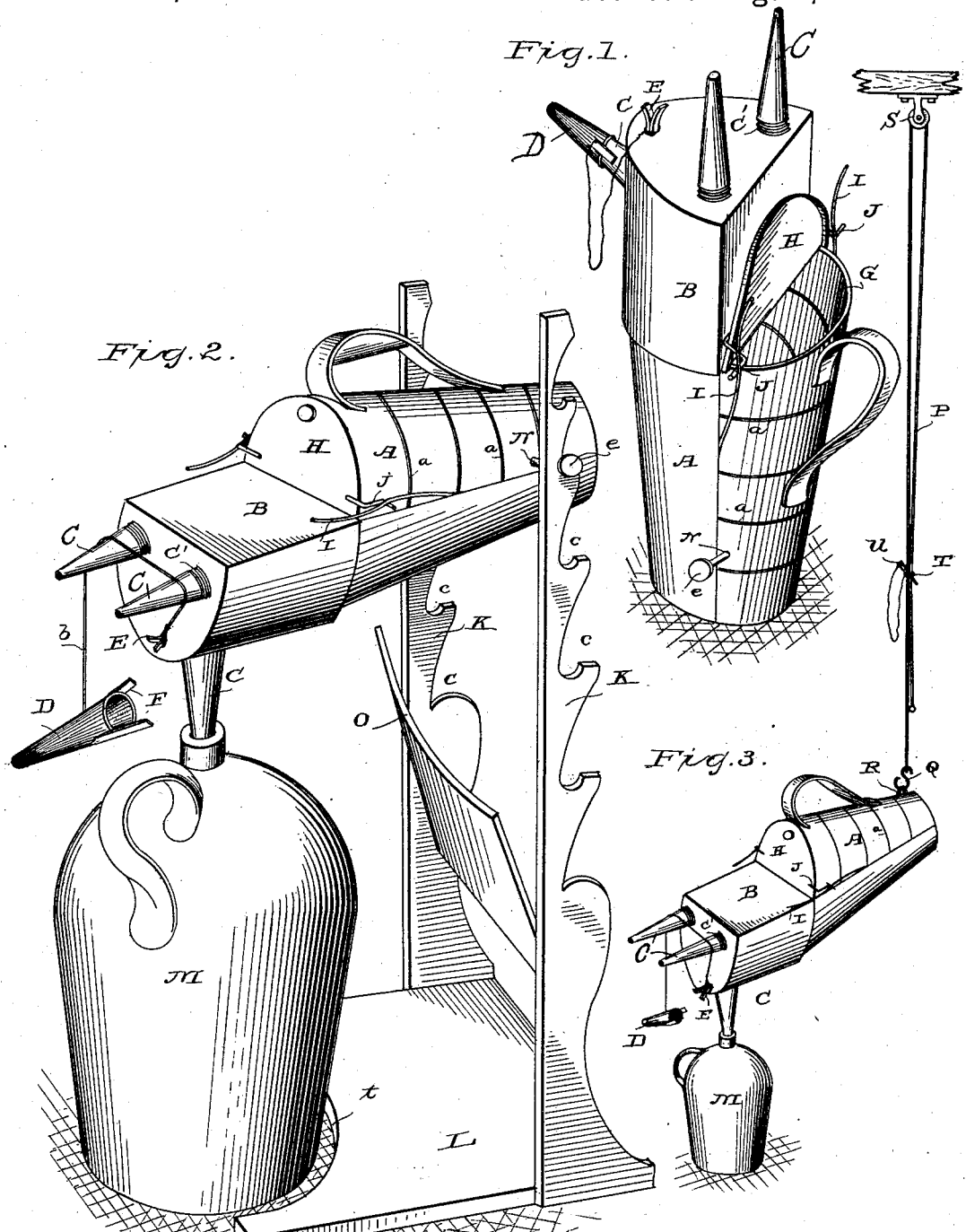

ELIJAH TRUMAN, OF PARKERSBURG, WEST VIRGINIA.

MEASURE.

SPECIFICATION forming part of Letters Patent No. 367,474, dated August 2, 1887.

Application filed August 12, 1886. Serial No. 210,738. (No model.)

*To all whom it may concern:*

Be it known that I, ELIJAH TRUMAN, of Parkersburg, in the county of Wood and State of West Virginia, have invented a new and useful Method for Measuring Molasses, Sirups, and other Thick and Slow-Flowing Fluids, and passing the same into jugs and other vessels; and I do hereby declare that the following is a full and exact description.

My invention relates to measures for liquids or fluids, and has for its object to provide a measure from which the liquid or fluid can be transferred to the receiving-vessel without the necessity of an attendant giving it his constant presence and attention, from which dirt and insects will be excluded, and from which other advantages will follow, as will be apparent from the following description; and to the accomplishment of such ends the invention consists in the construction and combination of parts, hereinafter particularly described and claimed.

In the accompanying drawings, forming part hereof, Figure 1 is a perspective view of the measure, with the lid or cover open; Fig. 2, a perspective of a stand, having the measure thereon in position to discharge its contents into a jug; Fig. 3, a perspective showing a modification in the suspending means.

The measure itself or lower portion thereof is designated by the letter A, and is preferably cylindrical in form and tapering from top to bottom, and provided with a graduated indicating-scale designated by the letter $a$, and which may be formed by indenting the material of which the measure is formed, so that, as shown, the scale can be seen from both the inside and the outside of the measure. The upper portion of the measure A is provided with a chamber, B, which partially covers the top of the measure, and is attached thereto by soldering or otherwise. This chamber is closed on all exterior sides, but opens into the measure, and is provided with a spout. The capacity of the chamber is preferably such that when the measure is tilted to discharge its contents the liquid or fluid contained in the measure will pass into the upper chamber to such an extent that it will not come in contact with the cover to the opening for the introduction of the liquid into the measure.

The spout or nozzle to the chamber B is designated by the letter C, and, as shown, is on the side. It is detachably secured, for instance, by screwing into the side of the chamber. A series of spouts or nozzles of different sizes are provided so that one can be removed and another substituted to suit the size of the neck to the receiving jug or vessel. The nozzles not in use are secured to the top of the chamber by screwing their base into screw-threaded necks C', formed on the top of the chamber, as shown. A cap, D, which may be of rigid material, but preferably is of elastic material, is provided for the nozzles, and is designed to prevent the ingress of dirt or flies. It is illustrated as secured by a cord, $b$, attached at one end to a catch or clasp, E, adapted to receive a part of the cap and hold the same. The cap is provided with lips or projections F, of rigid material, to be grasped by the fingers in manipulating it.

The opening or mouth G of the measure, which is that portion not covered by the chamber B, is provided with a lid or cover, H, hinged in any suitable way thereto and held in a closed or open position by means of a suitable spring.

The form of spring illustrated consists of spring strips or wires, I, secured at one end to the side of the measure and having the other end free. Fingers or crank-arms J, secured to the sides of the cover, extend under the spring strips and bear against the same, so that when the cover is down the strips will press down on the crank-arms and hold the cover closed, and when the cover is raised the strips will press upward against the arms and hold it open, as illustrated.

I do not mean to confine myself to any particular location of the strips and arms.

The measure so constructed, in order to be complete in its operation, is to be suspended by a suitable support permitting an adjustment of the measure. One form of support consists of standards K, formed with a series of notches or steps, $c$, and a base, L, which latter is designed to give stability to the support and may have a recess, $d$, to receive a portion of the receiving-vessel, which in the drawing is illustrated by the jug M. The measure is provided on each side with a pin or axle, N, designed to fit in the notches or steps of the standards and thus swing therefrom. The axles may have buttons or stops $e$ on their ends to prevent them from slipping out of their bearings in the standards. By raising or lowering the measure from one step to another it will be held at the desired height for a high or low receiving vessel. The nozzle of the measure enters the neck of the jug, and, resting therein, is supported when in an inclined position by resting upon the jug. When a bucket or other vessel is used having a mouth too wide to permit the nozzle to rest thereon, the measure may rest upon an arm or shelf, O, provided therefor and secured to the standards K.

Instead of using a support of the construction described, I may employ a rope, P, attached at its lower end to a hook, Q, passed through a loop or eye, R, secured to the measure, and then passed over a pulley, S, and its end brought down alongside the other portion of the cord and through a ring, T, which encircles the cord, the cord being thus doubled upon itself, with the strands encircled by the ring and a pin or wedge, U, pressed in between the strands and ring, so as to hold or lock the parts together. By withdrawing the wedge and lengthening or shortening the cord the measure will be adjusted to the desired height, and held to such adjustment by inserting the wedge, as before. It will be observed that by such modified construction an adjusting support is furnished for the measure.

Among some of the advantages of the invention may be mentioned the cleanliness it insures, as sirup, if that be the liquid to be dispensed, will be wholly inclosed, so that nothing will be exposed to catch dirt or attract flies or other insects; economy, because there will be no wastage from drippings; and saving in time, since the measure can be adjusted and left to discharge its contents while the attendant looks after other matters. Other advantages will be apparent and need not be enumerated.

I have shown and described what I consider the best form of the several parts; but I do not wish to be understood as confining myself to exact details in the construction of all parts.

Having described my invention and set forth its merits, what I claim is—

1. The measure provided with a chamber closed on all exterior sides and partially covering the top of the measure, and having a discharge-nozzle, and a cover to that portion of the top of the measure not covered by said chamber, substantially as described.

2. The measure provided with a chamber partially covering its top, a discharge-nozzle to said chamber, and a spring-controlled cover to close the portion of the top not covered by said chamber, substantially as described.

3. The measure provided with a chamber partially covering its top, a discharge-nozzle to said chamber, a hinged cover to that portion of the top not covered by said compartment, extensions from the cover, and springs secured to the body of the measure and bearing against said extensions, substantially as described.

4. The combination of a measure having pins or axles below its center of gravity, and a support having standards provided with notches at different heights to receive the axles of the measure, as and for the purposes set forth.

ELIJAH TRUMAN.

Witnesses:
 W. L. TIBBETTS,
 BARNA POWELL.